UNITED STATES PATENT OFFICE.

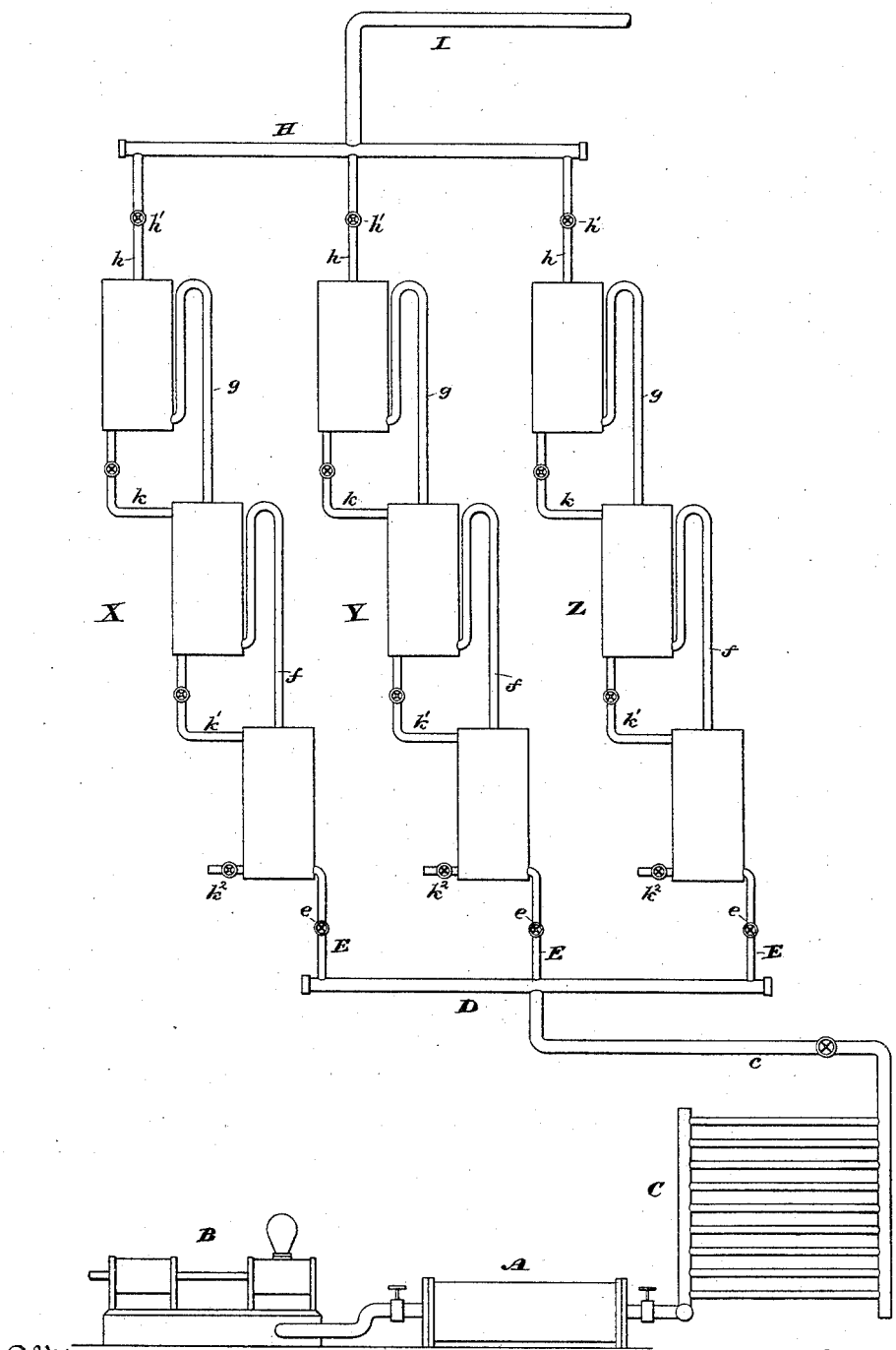

NORMAN H. BROKAW, OF KAUKAUNA, WISCONSIN.

APPARATUS FOR MAKING BISULPHITES.

SPECIFICATION forming part of Letters Patent No. 456,791, dated July 28, 1891.

Application filed May 14, 1889. Serial No. 310,732. (No model.)

*To all whom it may concern:*

Be it known that I, NORMAN H. BROKAW, of Kaukauna, in the county of Outagamie, in the State of Wisconsin, have invented certain new and useful Improvements in Apparatus for Manufacturing Bisulphite Liquors for Treating Vegetable Fiber, of which the following is a specification.

My invention more especially relates to that class of apparatus by which the bisulphite is produced by a continuous process, the advantage of which over apparatus working intermittently, in which the furnace or retort must be allowed to cool between each charge, is obvious.

The objects of my invention are to simplify the construction and improve the efficiency of the apparatus, which ends I attain by certain novel organizations of instrumentalities hereinafter specified.

The accompanying drawing represents diagrammatically a side elevation of so much of my improved apparatus as is necessary to illustrate the subject-matter claimed. Unless otherwise specified, the parts are of usual well-known construction.

A pump B, connected by a suitable pipe and valve with a retort A, forces the sulphur fumes generated therein through a condenser C, connected by a pipe $c$ with a manifold D. Tanks X Y Z are shown as arranged in three series, each tank of the series being arranged above and slightly to one side of the one below it, which facilitates compactness of arrangement of the pipe connections. Each of the bottom tanks is connected with the manifold D by a pipe E, provided with a stop-valve $e$, the pipe entering the tank at the bottom. The tops of the tanks in the two lower series are each connected by a pipe $f\ g$ with the bottom of the tank above it. These pipes are provided with goose-necks extending to about the top of the tanks to prevent the return of liquid through them. The bottom of each tank is also connected directly with the top of the tank below it by a pipe $k$, provided with a suitable stop-cock $k'$. Each of the lowest row of tanks is also provided at bottom with a tap $k^2$ for drawing off its contents. The top of each of the uppermost row of tanks is connected with a manifold H by a pipe $h$, provided with a valve or stop-cock $h'$. An exhaust or exit pipe I is in like manner connected with this manifold.

The operation of the apparatus will readily be understood from the foregoing description. The pump forces the sulphurous fumes generated in the retort through the condenser C and lower manifold D and its pipes E into the bottom of the lowermost row of tanks, whence it passes upward through the material contained therein, through the gooseneck pipe $f$ into the bottom of the second row of tanks, and so on through the series, ultimately escaping through the manifold H and its exit I. The liquid contents of the tanks may be drawn off through the pipes $k$ and tap $k^2$. Under the organization shown each vertical set of tanks is operated in series and each of the three vertical sets may be operated simultaneously, or one or more may be used while another is being cleaned out or replenished, thus rendering the operation continuous and obviating the necessity of cooling the retort or discontinuing its action.

The drawing shows three sets of tanks of three each; but obviously a greater number might be used, or two rows of two tanks each would work effectively, though not so efficiently as a greater number.

Having thus fully described the construction, organization, and operation of my improved apparatus, what I claim therein as new and as of my own invention is—

1. In an apparatus for manufacturing bisulphite liquors for treating vegetable fiber, the combination, substantially as hereinbefore set forth, of the generating-retort, the condenser connected therewith, the manifold connected with the condenser, duplicate series of tanks, pipes connecting the manifold with the bottom of the lower series of tanks, pipes connecting the top of each of the lower rows of tanks with the bottom of the one above it, liquid-discharge pipes connecting each tank with the one below it, a tap $k^2$ in each bottom tank, an exhaust-pipe connected with the top of each of the upper tanks, and a pump for forcing the circulation of the fumes throughout the system.

2. In an apparatus for manufacturing bisulphite liquors for treating vegetable fiber, the combination, substantially as hereinbefore set forth, of the generating-retort, the manifold connected therewith, duplicate series of tanks, pipes connecting the manifold with each of the lower row of tanks, stop-valves in each of these pipes connecting the top of each of the lower rows of tanks with the bottom of the one above it, liquid-discharge pipes connecting each tank with the one below it, an escape-pipe in each bottom tank, a gas-escape pipe for each top tank of the series, a manifold with which they are connected, an exit-pipe connected with the manifold, and a pump for forcing the circulation of the fumes throughout the system.

3. In an apparatus for manufacturing bisulphite liquors for treating vegetable fiber, the combination, substantially as hereinbefore set forth, of the generating-retort, the manifold connected therewith, tanks arranged in duplicate vertical series, pipes connecting this manifold with the bottom of each of the lower row of tanks, stop-valves in each of these pipes, pipes connecting the top of each of the lower rows of tanks with the bottom of the one above it, liquid-discharge pipes connecting the bottom of each tank with the top of the one below it, valves in these pipes, an escape-tap in the bottom of each lower tank, a gas-escape pipe for each top tank, its valve, a manifold connected with these pipes, and an exhaust-pipe connected with the manifold, whereby each series of tanks may be operated separately or simultaneously.

In testimony whereof I have hereunto subscribed my name.

NORMAN H. BROKAW.

Witnesses:
EDWARD C. DAVIDSON,
M. J. KELLEY.